US012593296B2

(12) United States Patent
Liu et al.

(10) Patent No.: US 12,593,296 B2
(45) Date of Patent: Mar. 31, 2026

(54) AT COMMAND FOR MO SMS ACCESS DOMAIN PREFERENCE SELECTION

(71) Applicant: MEDIATEK INC., Hsin-Chu (TW)

(72) Inventors: Ren-Huang Liu, Hsin-Chu (TW);
Marko Niemi, Oulu (FI)

(73) Assignee: MediaTek Inc., Hsinchu City (TW)

( * ) Notice: Subject to any disclaimer, the term of this patent is extended or adjusted under 35 U.S.C. 154(b) by 435 days.

(21) Appl. No.: 18/108,281

(22) Filed: Feb. 10, 2023

(65) Prior Publication Data

US 2023/0345404 A1     Oct. 26, 2023

Related U.S. Application Data

(60) Provisional application No. 63/334,724, filed on Apr. 26, 2022.

(51) Int. Cl.
*H04W 60/04*          (2009.01)
*H04W 4/14*           (2009.01)

(52) U.S. Cl.
CPC ............. *H04W 60/04* (2013.01); *H04W 4/14* (2013.01)

(58) Field of Classification Search
CPC ....... H04W 60/04; H04W 4/14; H04W 88/06; H04W 92/08; H04M 11/066
See application file for complete search history.

(56) References Cited

U.S. PATENT DOCUMENTS

| | | | | |
|---|---|---|---|---|
| 9,749,821 | B1 * | 8/2017 | Gupta ..................... | H04W 4/14 |
| 10,624,020 | B2 * | 4/2020 | Abraham .............. | H04W 40/02 |
| 10,869,245 | B2 * | 12/2020 | Huang-Fu ........... | H04L 47/6295 |
| 11,490,352 | B2 * | 11/2022 | Tiwari ................ | H04W 60/005 |
| 2009/0042576 | A1 * | 2/2009 | Mukherjee ............ | H04W 76/12 |
| | | | | 455/552.1 |
| 2014/0355586 | A1 * | 12/2014 | Tuttle, Jr. ................ | H04W 4/14 |
| | | | | 370/338 |
| 2016/0218962 | A1 * | 7/2016 | Huang-Fu ............... | H04L 47/36 |
| 2018/0199261 | A1 * | 7/2018 | Lee ..................... | H04W 74/002 |
| 2019/0253944 | A1 * | 8/2019 | Kim ................... | H04W 36/0072 |
| 2021/0168571 | A1 * | 6/2021 | Tang ..................... | H04W 60/04 |
| 2021/0306971 | A1 * | 9/2021 | Comaravelou ......... | H04W 4/14 |
| 2023/0269797 | A1 * | 8/2023 | Salkintzis ........... | H04L 12/4633 |

OTHER PUBLICATIONS

TS 127.007 (TS 127.007 V15.3.0 (Oct. 2018), "AT command set for User Equipment (UE) and CR 0580R1". 3GPP (Year: 2018).*

(Continued)

*Primary Examiner* — Lan N Moore

(57) ABSTRACT

A method of access domain preference selection for mobile originating short message service (MO SMS) using Attention (AT) command in EPS/5GS is provided. A new AT command is defined to specify the preferred access domain for UE to use for MO SMS over NAS messages when the UE supports non-3GPP access (e.g., in 5GS) and 3GPP access (e.g., in EPS/5GS). The set AT command (+CADSMS=[<access domain preference>]) is provided for the purpose of specify the access preference that the UE will use to send MO SMS over NAS message, the read AT command (+CADSMS?) returns the currently selected access preference, and a test AT command (+CADSMS=?) returns the supported access preference as a compound value.

18 Claims, 3 Drawing Sheets

(56)            References Cited

OTHER PUBLICATIONS

Gessner et al. (May 2011), Voice and SMS in LTE White Paper.
Rohde & Shwarz. (Year: 2011).*
Taiwan Intellectual Property Office Action 1121141828 , dated Oct.
19, 2023 (3 pages).
European Intellectual Property Office Action, dated Aug. 3, 2023
(10 pages).

* cited by examiner

400

| COMMAND | POSSIBLE RESPONSE |
|---|---|
| +CADSMS=[<access_domain_pref>] | |
| +CADSMS? | +CADSMS: <access_domain_pref> |
| +CADSMS=? | +CADSMS: (list of currently supported <access_domain_pref>s) |

FIG. 4

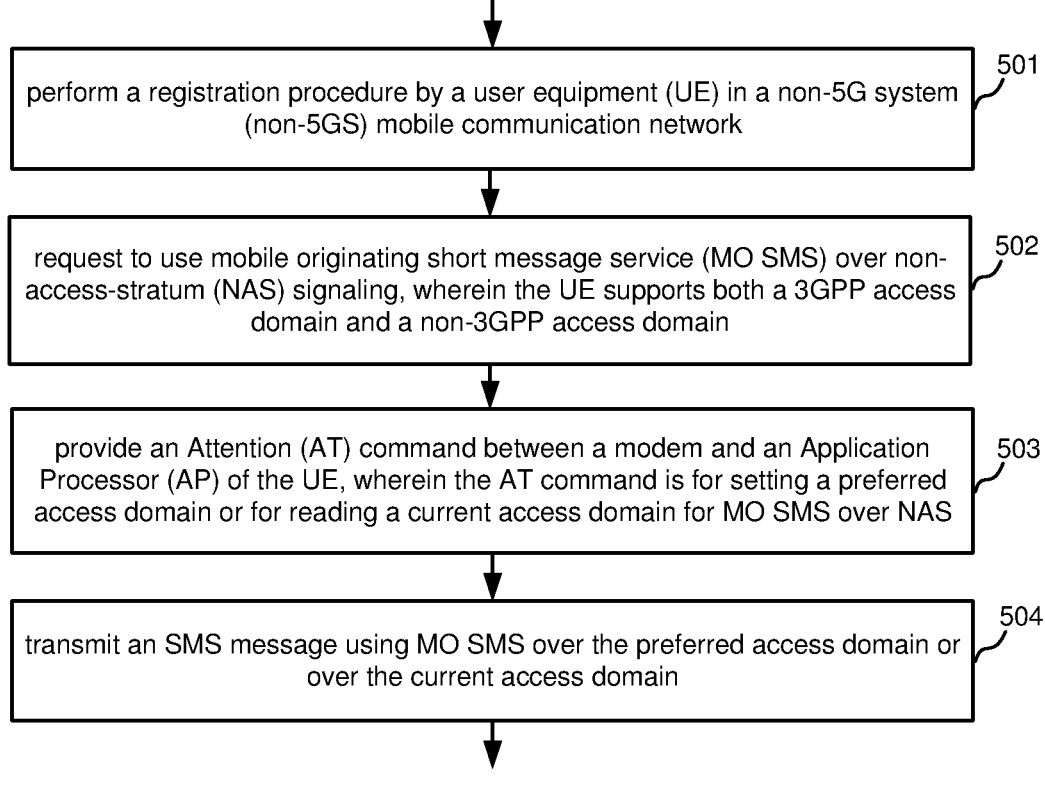

perform a registration procedure by a user equipment (UE) in a non-5G system (non-5GS) mobile communication network        501 request to use mobile originating short message service (MO SMS) over non-access-stratum (NAS) signaling, wherein the UE supports both a 3GPP access domain and a non-3GPP access domain        502 provide an Attention (AT) command between a modem and an Application Processor (AP) of the UE, wherein the AT command is for setting a preferred access domain or for reading a current access domain for MO SMS over NAS        503 transmit an SMS message using MO SMS over the preferred access domain or over the current access domain        504

FIG. 5

AT COMMAND FOR MO SMS ACCESS DOMAIN PREFERENCE SELECTION

CROSS REFERENCE TO RELATED APPLICATIONS

This application claims priority under 35 U.S.C. § 119 from U.S. Provisional Application No. 63/334,724, entitled "At command for MO SMS access domain preference selection," filed on Apr. 26, 2022, the subject matter of which is incorporated herein by reference.

TECHNICAL FIELD

The disclosed embodiments relate generally to wireless communication in mobile communication networks, and, more particularly, to AT command for mobile originating short message service (MO SMS) access domain preference selection.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems (5GS).

In 5G/NR, a Protocol Data unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., 3GPP radio access network (RAN), or via a non-3GPP RAN). The network/UE can initiate different PDU session procedures, e.g., PDU session establishment, PDU session modification, and PDU session release.

Due to new radio conditions, load balancing, or due to specific service, different handover procedures and intersystem change are used to handover a UE from a source 5G access network to a target 5G access or to a target 4G access network. Operators are seeking ways to balance data traffic between mobile networks and non 3GPP access in a way that is transparent to users and reduces mobile network congestion. In 5GS, UEs can be simultaneously connected to both 3GPP access (in e.g., FPS or 5GS) and non-3GPP access (using 3GPP NAS signalling), thus the 5GS is able to take advantage of these multiple accesses to improves the user experience, optimizes the traffic distribution across various accesses.

The 5G Session Management (5GSM) functionality can be provided towards the applications and the terminal devices using an Application Programming Interface (API).

Traditionally, for external applications, the EPS/IP bearer in LTE/4G networks and corresponding PDN connection management and resource allocation functionality may be provided through an AT command API in accordance with 3GPP Technical Specification (TS) 27.007 "AT command set for User Equipment (UE)". AT commands are used for controlling Mobile Termination (MT) functions and GSM/UMTS network services from a Terminal Equipment (TE) through Terminal Adaptor (TA).

Currently there is no AT command to support the access domain preference selection for mobile originating short message service (MO SMS) over NAS when UE is both registered in a 3GPP access (in a 3GPP system) and in a non-3GPP access in 5G. The existing AT Command+C5GSMS only supports the access domain preference selection when UE is both registered in 5GS 3GPP and non-3GPP accesses. When UE is both registered in a 3GPP access (e.g., in EPS) and non-3GPP access, the MO SMS preference cannot be configured via AT command.

A solution is sought.

SUMMARY

A method of access domain preference selection for mobile originating short message service (MO SMS) using Attention (AT) command in EPS/5GS is provided. A new AT command is defined to specify the preferred access domain for UE to use for MO SMS over NAS messages when the UE supports non-3GPP access (e.g., in 5GS) and 3GPP access (e.g., in EPS/5GS). The set AT command (+CADSMS=[<access domain preference>]) is provided for the purpose of specify the access preference that the UE will use to send MO SMS over NAS message, the read AT command (+CADSMS?) returns the currently selected access preference, and a test AT command (+CADSMS=?) returns the supported access preference as a compound value.

In one embodiment, a UE performs a registration procedure in a non-5G system (non-5GS) mobile communication network. The UE requests to use mobile originating short message service (MO SMS) over non-access-stratum (NAS) signaling, wherein the UE supports both a 3GPP access domain and a non-3GPP access domain. The UE provides an Attention (AT) command between a modem and an Application Processor (AP) of the UE, wherein the AT command is for setting a preferred access domain or for reading a current access domain for MO SMS over NAS. The UE transmits an SMS message using MO SMS over the preferred access domain or over the current access domain.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 illustrate one embodiment of an AT command +CADSMS for access domain preference selection in EPS/5GS in accordance with one novel aspect.

FIG. 5 illustrates a flow chart of a method of access domain preference selection for MO SMS in EPS/5GS in accordance with one novel aspect.

DETAILED DESCRIPTION

Reference will now be made in detail to some embodiments of the invention, examples of which are illustrated in the accompanying drawings.

Figure 1:
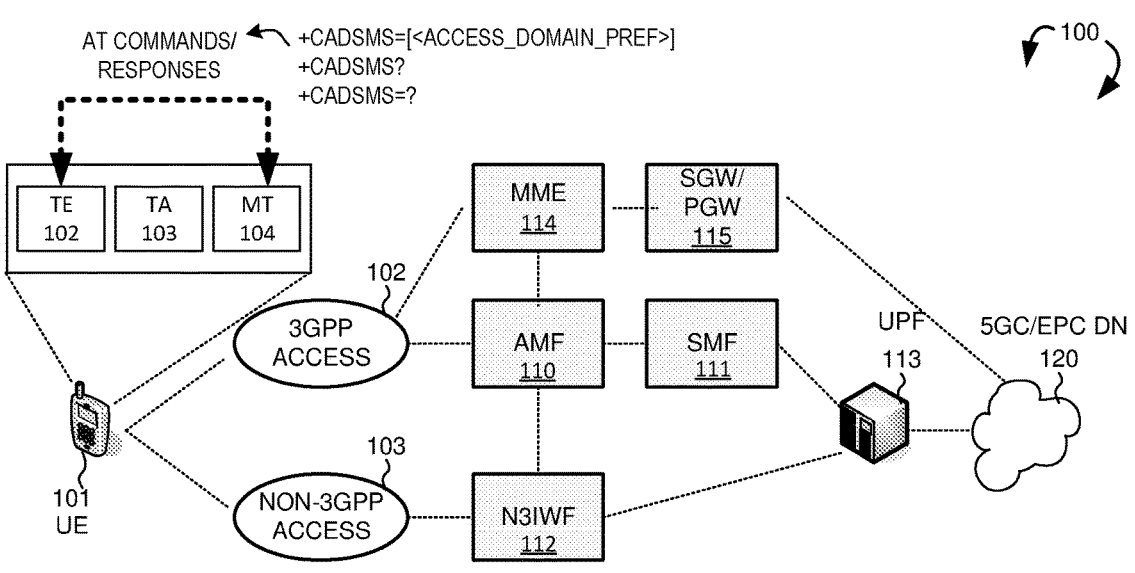
FIG. 1 illustrates an AT command for mobile originating short message service (MO SMS) access domain preference selection in EPS/5GS in accordance with one novel aspect.

FIG. 1 illustrates an AT command for mobile originating short message service (MO SMS) access domain preference selection in a 4G evolved packet system or a 5G system (EPS/5GS) 100 in accordance with one novel aspect. 5GS/EPS network 100 comprises a user equipment UE 101, a 3GPP radio access network RAN 102, a non-3GPP radio access network RAN 103, an Access and Mobility Management Function (AMF) 110 or a mobility management entity (MME) 114, a Session Management Function (SMF) 111, or a serving gateway/packet data network gateway (SGW/PGW) 115, a Non-3GPP Interworking Function (N3IWF) 112, a User Plane Function (UPF) 113, and a 5G core (5GC) or Evolved Packet core (EPC) data network 120. The AMF/MME communicates with the base station, and is responsible for access and mobility management of wireless access devices in mobile communication network 100. The SMF/SGW/PGW is primarily responsible for interacting with the decoupled data plane, creating, updating, and removing Protocol Data Unit (PDU) sessions and managing session context with the UPF. The N3IWF functionality interfaces to 5GC/EPC core network control plane functions, responsible for routing messages outside 5G/4G RAN.

In Access Stratum (AS) layer, RAN provides radio access for UE 101 via a radio access technology (RAT). In Non-Access Stratum (NAS) layer, AMF and SMF communicate with RAN and 5GC/EPC for access and mobility management and PDU session management of wireless access devices in 5G network 100. 3GPP Radio access network RAN 102 may include base stations (gNBs or eNBs) providing radio access for UE 101 via various 3GPP RATs including 5G, 4G, and 3G/2G. Non-3GPP radio access network RAN 103 may include access points (APs) providing radio access for UE 101 via non-3GPP RAT including WiFi. UE 101 can obtain access to data network 120 through 3GPP access 102, AMF 110, SMF 111, and UPF 113 in 5GS, or through 3GPP access 102, MME 114, and SGW/PGW 115 in EPS. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., 3GPP radio access network (RAN), or via a non-3GPP RAN). The network/UE can initiate different PDU session procedures, e.g., PDU session establishment, PDU session modification, and PDU session release.

Due to new radio conditions, load balancing, or due to specific service, different handover procedures and intersystem change are used to handover a UE from a source 5G access network to a target 5G access or to a target 4G access network. Operators are seeking ways to balance data traffic between mobile networks and non-3GPP access in a way that is transparent to users and reduces mobile network congestion. In 5GS, UEs can be simultaneously connected to both 3GPP access (in e.g., EPS or 5GS) and non-3GPP access (using 3GPP NAS signalling), thus the 5GS is able to take advantage of these multiple accesses to improve the user experience, optimizes the traffic distribution across various accesses.

The 5G Session Management (5GSM) functionality can be provided towards the applications and the terminal devices using an Application Programming Interface (API). Traditionally, for external applications, the EPS/IP bearer in LTE/4G networks and corresponding PDN connection management and resource allocation functionality may be provided through an AT command API in accordance with 3GPP Technical Specification (TS) 27.007 "AT command set for User Equipment (UE)". AT commands are used for controlling Mobile Termination (MT) functions and GSM/UMTS network services from a Terminal Equipment (TE) through Terminal Adaptor (TA).

Currently there is no AT command to support the MO SMS over NAS access domain preference selection when UE is both registered in a 3GPP access (in a 3GPP system) and in a non-3GPP access in 5G. The existing AT Command+C5GSMS only supports the access domain preference selection when UE is both registered in 5GS 3GPP and non-3GPP accesses. When UE is both registered in a 3GPP access (e.g., in EPS) and non-3GPP access, the MO SMS preference cannot be configured via AT command. In accordance with one novel aspect, a method of access domain preference selection for MO SMS in EPS/5GS is provided.

In the example of FIG. 1, UE 101 includes a TE 102, a TA 103, and an MT 104. TE 102 can use AT commands to control MT 104 to perform management functionality. For example, TE 102 can use AT commands for querying the current access domain preference and for setting the access domain preference. The TA 103, MT 104 and TE 102 may be implemented in the form of separate or integrated entities as needed. As depicted in FIG. 1, a new AT command is defined to configure UE 101 to select a preferred access domain for SMS when the UE is supporting a 3GPP 2G/3G/4G/5G access and non-3GPP access. For example, the new set AT command +CADSMS is defined to set the preferred access domain for MO SMS over NAS messages when the UE supports a non-3GPP access in 5GS and a 3GPP access in EPS or in another 3GPP system.

Further, the upper layer of UE 101 can query for the current MO SMS access domain preference via an AT command. AT commands are used for controlling Mobile Termination (MT) functions and network services from a Terminal Equipment (TE) through Terminal Adaptor (TA). The AT commands can be a notification of an unsolicited result code, or a configuration command. In FIG. 1, for example, MT 104 receives an AT command from TE 102 for querying the MO SMS access domain preference. In response, MT 104 sends an MT status back to TA 103, which converts to a response to be sent to TE 102, indicating the current MO SMS access domain preference.

Figure 2:
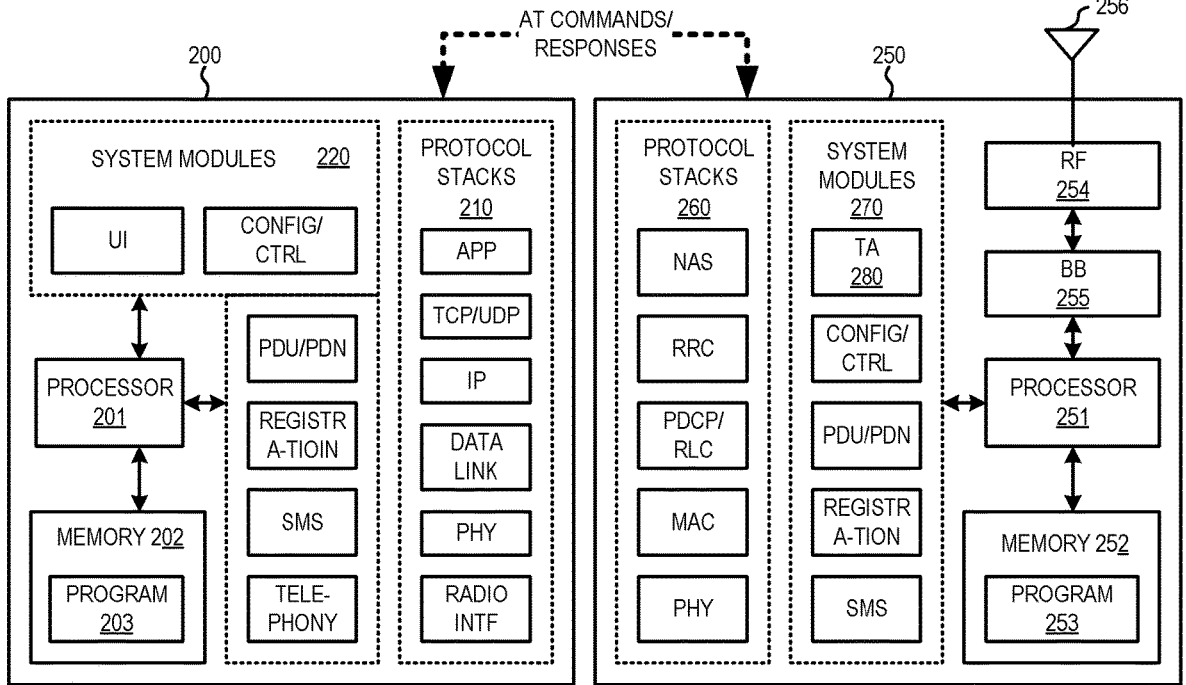
FIG. 2 illustrates a simplified block diagram of an architecture comprising a Terminal Equipment (TE) and a Mobile Termination (MT) in accordance with one novel aspect.

FIG. 2 illustrates a simplified block diagram of an architecture comprising a Terminal Equipment (TE) and a Mobile Termination (MT) in accordance with one novel aspect. TE 200 includes a processor 201, memory 202, and protocol stacks 210 including Application (APP) layer, Transport (TCP/UDP) layer, Network (IP) layer, Data Link layer, and Physical (PHY) layer. TE 200 further includes system control modules and circuits 220 including a user interface, a configuration and control module, a PDU session/PDN connection handler, a registration handler, an SMS handler, and a telephony module. Processor 201 processes different applications and invokes different system control modules to perform various features of TE 200. Memory 202 stores program instructions and data 203 to control the operations of TE 200. The system control modules and circuits can be implemented and configured to carry out functional tasks of TE 200. Note that TE 200 may also be referred to as an Application Processor (AP). Typically, TE 200 is also equipped with telephony framework circuits (e.g., a dialer, a call manager etc.) to support voice call functionality. In addition, TE 200 also supports the AT commands as defined by 3GPP TS 27.007 for controlling MT functions and GPRS packet domain services based on contexts for each PDP/PDN/PDU session identified by CID.

MT 250 has an antenna 256, which transmits and receives radio signals. An RF transceiver module 254, coupled with the antenna, receives RF signals from antenna 256, converts them to baseband signals and sends them to processor 251 via baseband module 255. RF transceiver 254 also converts received baseband signals from processor 251 via baseband module 255, converts them to RF signals, and sends out to antenna 256. Processor 251 processes the received baseband signals and invokes different functional modules to perform features in MT 250. Memory 252 stores program instructions and data 253 to control the operations of MT 250. MT 250 also comprises a set of protocol stacks 260 and control circuits including various system modules 270 to carry out functional tasks of MT 250. Protocol stacks 260 includes Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 270 includes a configuration and control module, a PDU/PDN session/connection handler, a registration handler, and an SMS handler. Note that MT 250 may also be referred to as a modem. In the example of FIG. 2, MT 250 further includes a Terminal Adaptor (TA 280) that receives and transmits AT commands and converts the AT commands to be processed by processor 251 for controlling MT functions. In one example, TA 280 receives an AT read command from TE 200 for MT 250 to provide the current MO SMS access domain preference. In another example, TE 200 sends an AT set command to MT 250 for configuring a preferred MO SMS access domain preference.

Figure 3:
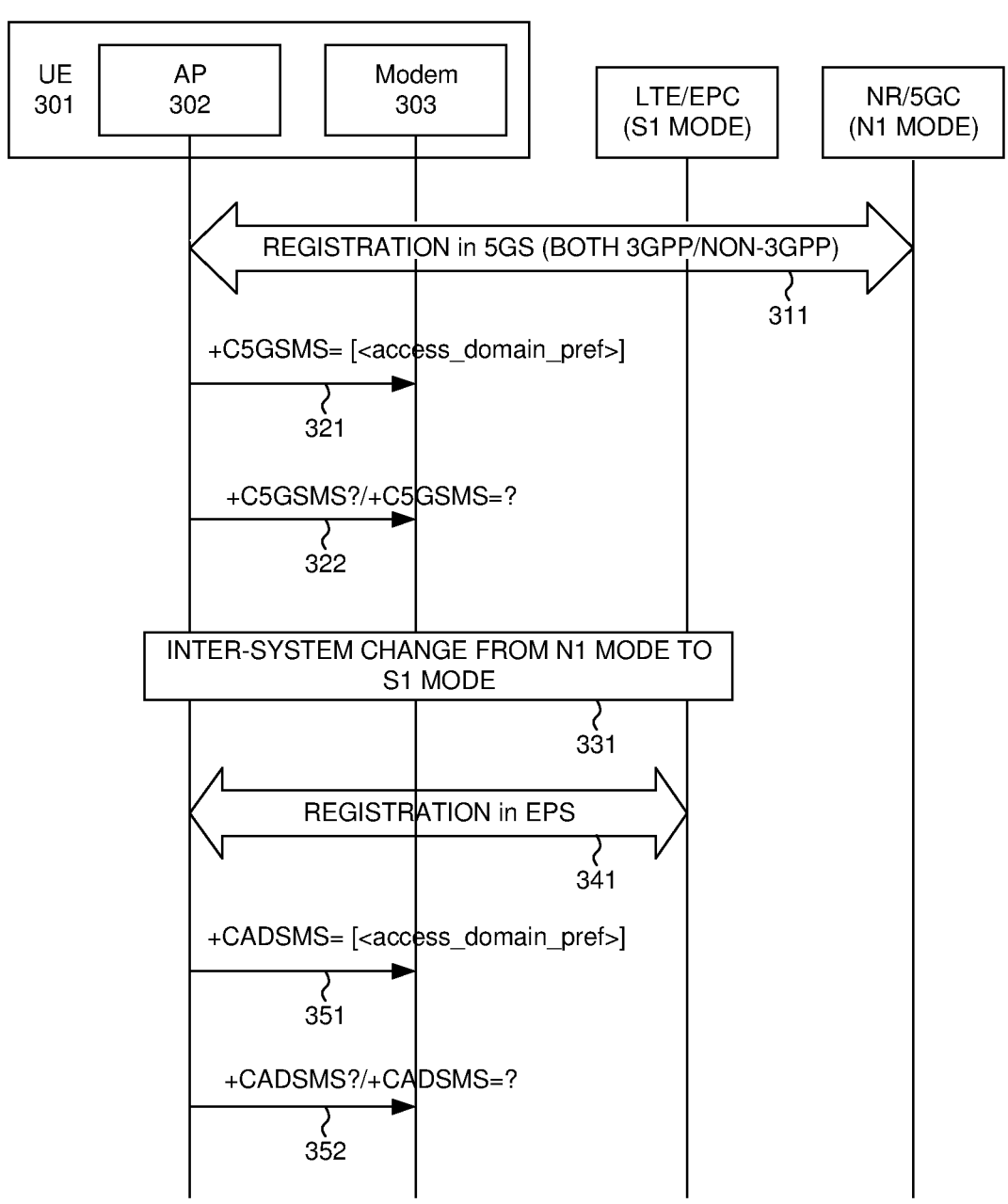
FIG. 3 illustrates a message flow of using an AT command for MO SMS in 5GS and in EPS after intersystem change in one novel aspect.

FIG. 3 illustrates a message flow of using an AT command for MO SMS in 5GS and in EPS after intersystem change in one novel aspect. UE 301 comprises an AP 302 and a modem 303. In step 311, UE 301 performs registration in NR/5G network. UE 301 may be both registered in a 3GPP access (e.g., in EPS/5GS) and in a non-3GPP access (e.g., in 5GS). UE 301 may switch between LTE and 5GS in the 3GPP domain depending on the radio signal quality and/or other conditions, and UE 301 is allowed to stay in both 3GPP (in e.g., EPS or 5GS) and non-3GPP access. In addition, UE 301 may want to use MO SMS over a preferred access domain (e.g., 3GPP or non-3GPP).

For example, if UE 301 requests the use of SMS over NAS, the UE shall include the 5GS update type IE in the REGISTRATION REQUEST message with the SMS requested bit set to "SMS over NAS supported". If the 5GS update type IE was included in the REGISTRATION REQUEST message with the SMS requested bit set to "SMS over NAS supported", and SMSF selection is successful, then the AMF shall send the REGISTRATION ACCEPT message after the SMSF has confirmed that the activation of the SMS service was successful. When sending the REGISTRATION ACCEPT message, the AMF shall set the SMS allowed bit of the 5GS registration result IE to "SMS over NAS allowed" in the REGISTRATION ACCEPT message, if the UE has set the SMS requested bit of the 5GS update type IE to "SMS over NAS supported" in the REGISTRATION REQUEST message and the network allows the use of SMS over NAS for the UE.

For external applications, the session management functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In 5GS, for example, if UE 301 wants to use MO SMS over a preferred access domain (e.g., 3GPP or non-3GPP), then a set AT command (+C5GSMS= [<access domain preference>]) is provided for the purpose of specify the access preference that the UE will use to send MO SMS over NAS message (321), a read AT command (+C5GSMS?) returns the currently selected access preference (322), and a test AT command (+C5GSMS=?) returns the supported access preference as a compound value (322).

In step 331, UE 301 performs intersystem change from 5GS (N1 mode) to EPS (Si mode). In step 341, UE 301 performs registration in LTE/EPS network. UE 301 may want to use MO SMS over NAS message, which is sent over a specific access domain (3GPP or non-3GPP). Note that the existing AT command +C5GSMS only works in 5GS, and it does not work in EPS or in other non-5GS network. In accordance with one novel aspect, a new AT command +CADSMS is defined to specify the preferred access domain for UE 301 to use for MO SMS over NAS messages when the UE supports non-3GPP access (e.g., in 5GS) and 3GPP access (e.g., in EPS or 5GS). The set AT command (+CADSMS=[<access domain preference>]) is provided for the purpose of specify the access preference that the UE will use to send MO SMS over NAS message (351), the read AT command (+CADSMS?) returns the currently selected access preference (352), and a test AT command (+CADSMS=?) returns the supported access preference as a compound value (352).

Note that the AT commands can be a notification of an unsolicited result code, or a configuration command. In FIG. 3, for example, AP 302 sends an AT command to MD 303 indicating the MO SMS access domain preference, and then MD 303 receives an AT command from AP 302 for querying the current MO SMS access domain preference. In response, Modem 303 sends an MT status back to a TA, which converts to a response to be sent to AP 302, indicating the current MO SMS access domain preference.

FIG. 4 illustrate one embodiment of an AT command +CADSMS for access domain preference selection in EPS/5GS in accordance with one novel aspect. As illustrated in table 400, the AT command +CADSMS is a set or read or test command. The set command is used to specify the preferred access domain for the MT to use for MO SMS over NAS messages when the UE supports a non-3GPP access in 5GS and a 3GPP access (e.g., in EPS or 5GS). The execution of the read command returns the currently selected access domain preference. The execution of the test command returns the supported access domain preference as a compound value. The defined value of [<access_domain_pref>]: integer type, indicates the access preference to use to send MO SMS over NAS message, where a value of "0" indicates 3GPP access preferred, non-3GPP access is used if 3GPP access is not available; and a value of "1" indicates non-3GPP access preferred, 3GPP access is used if non-3GPP access is not available.

FIG. 5 illustrates a flow chart of a method of access domain preference selection for MO SMS in EPS/5GS in accordance with one novel aspect. In step 501, a UE performs a registration procedure in a non-5G system (non-5GS) mobile communication network. In step 502, the UE requests to use mobile originating short message service (MO SMS) over non-access-stratum (NAS) signaling, wherein the UE supports both a 3GPP access domain and a non-3GPP access domain. In step 503, the UE provides an Attention (AT) command between a modem and an Application Processor (AP) of the UE, wherein the AT command is for setting a preferred access domain or for reading a current access domain for MO SMS over NAS. In step 504, the UE transmits an SMS message using MO SMS over the preferred access domain or over the current access domain.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
performing a registration procedure by a user equipment (UE) in a non-5G system (non-5GS) mobile communication network, wherein the non-5GS is an evolved packet system (EPS);
requesting to use mobile originating short message service (MO SMS) over non-access-stratum (NAS) signaling, wherein the UE supports both a 3GPP access domain and a non-3GPP access domain;
providing an Attention (AT) command between a modem and an Application Processor (AP) of the UE when the UE is registered, wherein the AT command is for setting a preferred access domain or for reading a current access domain for MO SMS over NAS; and
transmitting an SMS message using MO SMS over the preferred access domain or over the current access domain.

2. The method of claim 1, wherein the UE sends a REGISTRATION REQUEST message to the non-5GS mobile communication network with an SMS requested bit set to "SMS over NAS supported".

3. The method of claim 1, wherein the AT command is a set command +CADSMS=[<access_domain_pref>] for configuring the preferred access domain for MO SMS.

4. The method of claim 3, wherein <access_domain_pref> is an integer indicating whether 3GPP access or non-3GPP access is the preferred access domain.

5. The method of claim 1, wherein the AT command is a read command +CADSMS? for querying the current access domain preference for MO SMS.

6. The method of claim 1, wherein the AT command is a test command +CADSMS-? for reporting supported MO SMS access domain preferences as a compound value.

7. The method of claim 1, wherein the UE performs an intersystem change from a 5G system (5GS) to the non-5GS.

8. The method of claim 7, wherein the UE is both registered in a 3GPP access and in a non-3GPP access in the 5GS.

9. The method of claim 7, wherein the UE uses an AT command +CADSMS to set or read an access domain for MO SMS over NAS in the 5GS.

10. A User Equipment (UE), comprising:
a registration handling circuit that performs a registration procedure in a non-5G system (non-5GS) mobile communication network, wherein the non-5GS is an evolved packet system (EPS);
a configuration circuit that requests to use mobile originating short message service (MO SMS) over non-access-stratum (NAS) signaling, wherein the UE supports both a 3GPP access domain and a non-3GPP access domain;
a modem and an Application Processor (AP) of the UE that provides an Attention (AT) command when the UE is registered, wherein the AT command is for setting a preferred access domain or for reading a current access domain for MO SMS over NAS; and
a transmitter that transmits an SMS message using MO SMS over the preferred or current access domain.

11. The UE of claim 10, wherein the UE sends a REGISTRATION REQUEST message to the non-5GS mobile communication network with an SMS requested bit set to "SMS over NAS supported".

12. The UE of claim 10, wherein the AT command is a set command +CADSMS=[<access_domain_pref>] for configuring the preferred access domain for MO SMS.

13. The UE of claim 12, wherein <access_domain_pref> is an integer indicating whether 3GPP access or non-3GPP access is the preferred access domain.

14. The UE of claim 10, wherein the AT command is a read command +CADSMS? for querying the current access domain preference for MO SMS.

15. The UE of claim 10, wherein the AT command is a test command +CADSMS=? for reporting supported MO SMS access domain preferences as a compound value.

16. The UE of claim 10, wherein the UE performs an intersystem change from a 5G system (5GS) to the non-5GS.

17. The UE of claim 16, wherein the UE is both registered in a 3GPP access and in a non-3GPP access in the 5GS.

18. The UE of claim 16, wherein the UE uses an AT command +CADSMS to set or read an access domain for MO SMS over NAS in the 5GS.

* * * * *